United States Patent [19]
Eskildsen et al.

[11] Patent Number: 5,959,750
[45] Date of Patent: Sep. 28, 1999

[54] METHOD OF UPGRADING TRANSMISSION CAPACITY BY RAMAN AMPLIFICATION

[75] Inventors: Lars Erik Eskildsen, Fair Haven, N.J.; Stephen Gregory Grubb, Fremont, Calif.; Per Bang Hansen, Bradley Beach, N.J.; Andrew John Stentz, Scotch Plains, N.J.; Kenneth Lee Walker, New Providence, N.J.

[73] Assignee: Lucent Technologies Inc., Murray Hill, N.J.

[21] Appl. No.: 08/659,607

[22] Filed: Jun. 6, 1996

[51] Int. Cl.$^6$ ........................................ H04J 14/02
[52] U.S. Cl. ........................ 359/134; 359/160; 359/334
[58] Field of Search .................... 359/134, 160, 359/173, 188, 195, 334, 341

[56] References Cited

U.S. PATENT DOCUMENTS

| | | | |
|---|---|---|---|
| 4,616,898 | 10/1986 | Hicks, Jr. ............................ | 350/96.15 |
| 5,675,428 | 10/1997 | Henmi .................................... | 359/160 |

OTHER PUBLICATIONS

"Experimental demonstration of soliton propagation in long fibers: loss compensated by Raman gain," L. F. Mollenauer et al, *Optical Letter*, vol. 10, No. 5, pp. 229–231, 1985.

"2.488–Gb/s Unrepeatered transmission over 529 km using remotely pumped post–and pre–amplifiers, forward error correction, and dispersion compensation", P. B. Hansen et al., *Proc. OFC '95*, Paper PD–25, San Diego, CA, Feb. 1995.

"511km at 2.5Gbit/s and 531km at 622 Mbit/s—Unrepeatered Transmission with Remote pumped amplifiers, Forward error Correction and Dispersion Compensation," S. S. Sian et al., *Proc. OFC '95*, Paper PD–26, San Diego, CA., Feb. 1995.

"Fundamental–mode dispersion–compensating fibers: design considerations and experiments," A. M. Vengsarkar et al., *Proc. OFC '94*, Paper ThK2, San Jose, CA, Feb. 1994.

"Comparison of Raman efficiencies in optical fibers,"V. L. daSilva et al., *Proc. OFC '94*, Paper WK13, San Jose, CA, Feb. 1994.

G. P. Agrawal, *Nonlinear Fiber Optics* (Academic Press, New York), 1989, Chap. 8.

Primary Examiner—Kinfe-Michael Negash
Attorney, Agent, or Firm—Jeffery J. Brosemer

[57] ABSTRACT

An upgrade method in which Raman amplification is added to an existing transmission system to provide an increase in power budget and permit a substantial increase in transmission capacity either by time division multiplexing (TDM), wavelength division multiplexing (WDM), or a combination thereof. The power budget improvement permits higher transmission capacity by increasing either a single channel data rate and/or the number of wavelength division multiplexed data channels that can be accommodated by existing fiber links.

23 Claims, 6 Drawing Sheets

METHOD OF UPGRADING TRANSMISSION CAPACITY BY RAMAN AMPLIFICATION

BACKGROUND OF THE INVENTION

1. Field of the Invention

The present invention relates generally to optical communication systems and, more particularly, to methods of increasing the transmission capacity of such systems, in which optical transmitters and receivers are optically interconnected by individual optical fiber links.

2. Discussion of the Prior Art

Many existing optical communication systems employ fiber links that are only capable of handling single channel transmission at rates of up to 10 Gb/s.

A basic single channel optical communication system 10 is depicted in FIG. 1 and includes a transmitter 12, a communication link comprising a section of single mode optical fiber 14, and a receiver 16. As seen in FIG. 1, the transmitter 12 typically includes an optical source such as a distributed feedback laser (DFB) 18 and a modulator 20 for modulating the optical signal output by the DFB with digital data. The modulated signal is launched into fiber link 14 for transmission to receiver 16, where the optical signal is detected and demodulated.

As demand for telecommunications services continues to dramatically expand, it has become an economic necessity to develop and employ various techniques to increase the transmission capacity of existing optical communication networks. One proposed approach to the problem of increasing transmission capacity has been to replace the existing optical fiber links with new links and to employ optical repeaters to achieve multiple channel (more than one wavelength) transmission. As will be readily appreciated by those skilled in the art, however, such an upgrade operation would require a significant capital investment and would render different nodes of the network inoperable at different times, with the potential of disrupting service to many subscribers.

Accordingly, there remains a need for an upgrade approach which provides a substantial increase in the data carrying capability of existing optical communication systems without the service disruption and expense associated with the excavation and replacement of the optical communication links employed in such systems.

SUMMARY OF THE INVENTION

The aforementioned needs are addressed, and an advance is made in the art, by an upgrade technique in which Raman amplification is added to a transmission system to provide an increase in power budget and thereby allow for substantial increase in transmission capacity either by time division multiplexing (TDM), wavelength division multiplexing (WDM), or a combination thereof. According to the present invention, the transmission fibers of the system to be upgraded act as distributed amplifiers, that is, amplification occurs directly in each fiber. Accordingly, the use of Raman gain facilitates the upgrade of a transmission system without changes to the fiber span by increasing the overall power budget of the link. The power budget improvement facilitates a higher transmission capacity by increasing either the single channel data rate and/or the number of wavelength division multiplexed channels that can be accommodated by the existing fiber links(s) of the system.

In one embodiment of the inventive upgrade, multiple channel transmission system is achieved by configuring the transmitter with a plurality of optical sources such, for example, as diode pumped sources and providing, at the terminal or receiver end, a counter-propagating pump source to provide Raman gain over the existing optical fiber. Illustratively, the output of four optical sources may be modulated at a rate of 10 Gb/s and wavelength division multiplexed for transmission over an existing optical fiber link to achieve a four-fold increase in transmission capacity as compared to a system in which only the output of a single optical source can be accommodated by the same fiber.

In an alternate embodiment of the inventive upgrade, a similar four-fold increase in data carrying capacity over the existing link may also be achieved by time division multiplexing the optical output signal of a transmitter that employs a single optical source.

DETAILED DESCRIPTION OF THE INVENTION

Figure 1:
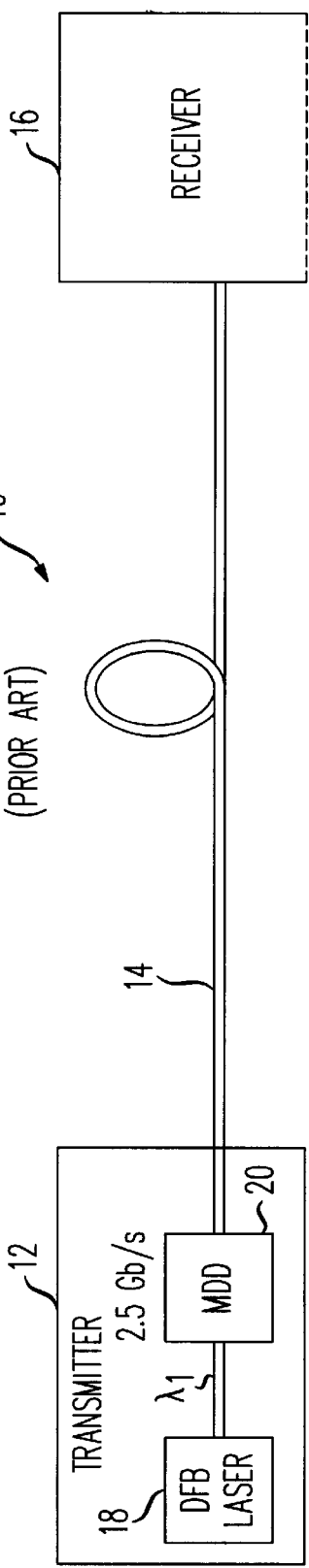
FIG. 1 is a schematic view depicting an existing optical communication system employing single channel transmission over a single mode fiber communication link.
Figure 2:
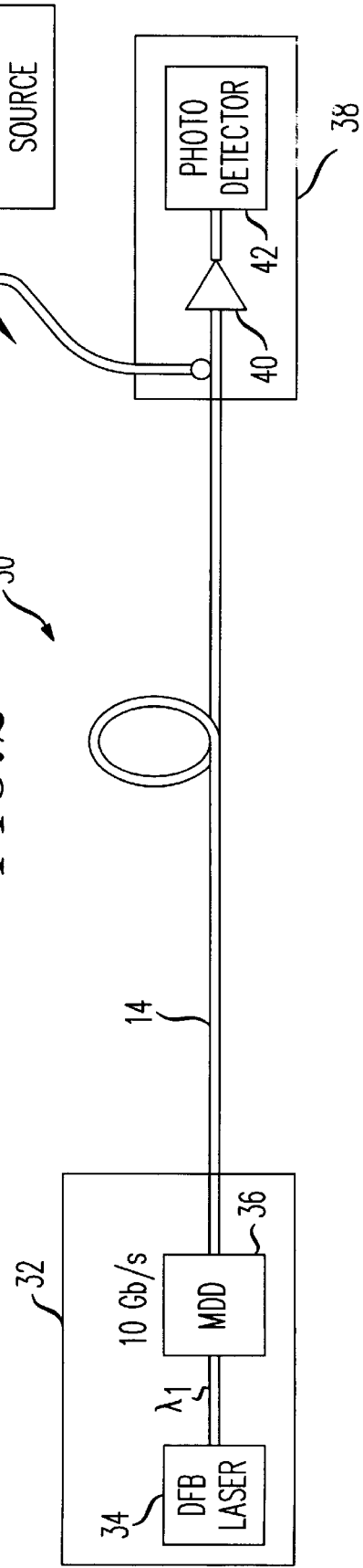
FIG. 2 is a schematic view depicting improved single channel transmission, over the single mode fiber communication link of FIG. 1, via the use of time division multiplexing of the optical output signal and the introduction of Raman amplification at the terminal end, in accordance with an illustrative embodiment of the upgrade technique of the present invention, to thereby obtain an n-fold increase in the transmission capacity over the system of FIG. 1.

An illustrative arrangement for upgrading the existing communication system of FIG. 1 by employing Raman amplification, in accordance with the most basic form of the present invention, is shown in FIG. 2. As demonstrated in FIG. 2, the present invention contemplates a significant increase in the transmission capacity of an existing optical fiber link as link 14 without extensive modification to the existing communication system. By way of illustrative example, an upgrade from 2.5 Gb/s to 10 Gb/s single channel transmission may be achieved by the addition of a Raman gain source at the terminal end of the fiber link 14 and corresponding changes at the transmitter (head) end and receiver (terminal) end to accommodate time division multiplexing and demultiplexing of the optical signal transmitted over fiber link 14.

As seen in FIG. 2, upgraded system 30 thus comprises a transmitter 32 that includes a suitable optical source 34 such, for example, as a distributed feedback, diode pumped laser, to provide an optical signal having a suitable communications wavelength. Illustratively, the wavelength output may be in the range of between from 1525 to 1585 nm and may be, for example, 1555 nm. In the illustrative embodiment of FIG. 2, the optical source 34 is externally modulated. Accordingly, transmitter 32 further includes a modulator 36 for modulating the optical signal output by optical source 34 with digital data to be transmitted via fiber link 14 to a remote receiver 38. Illustratively, receiver 38 includes a preamplifier 40 and a PIN photodetector 42 and appropriate circuitry (not shown) for demultiplexing received TDM optical signals.

A Raman gain or pump source 44 is provided at the terminal end of fiber link 14. In the illustrated embodiment, in which the wavelength channels is in the wavelength range between 1550 nm and 1560 nm, a pump source wavelength of 1453 nm was employed since it provides maximum gain over that range.

During experimental investigation of the use of Raman amplification in systems employing single channel transmission, in which the demonstrated receiver sensitivity corresponding to a bit-error rate of $10^{-9}$ was −43.4 dBm in a system operating at a rate of 2.5 Gb/s without Raman amplification, a launch power of 20.2 dBm resulted in a power budget of 63.6 dBm.

When Raman gain was applied to the same system under investigation by launching 1.0 W of 1453 nm light backwards into the fiber link from the receiver end, the effective sensitivity of the receiver improved by 7.4 dB. In order to realize the full potential of the increase in power budget achieved utilizing Raman amplification in accordance with the present invention, then, the optical signal output by optical source 34 may be time division multiplexed to achieve a substantially higher transmission rate as was possible prior to upgrading. It is therefore contemplated by the inventors herein that by adding Raman gain to an existing 2.5 Gb/s transmission system, it is possible to upgrade the capacity of the existing links without modifications to the fiber span(s).

Figure 3:
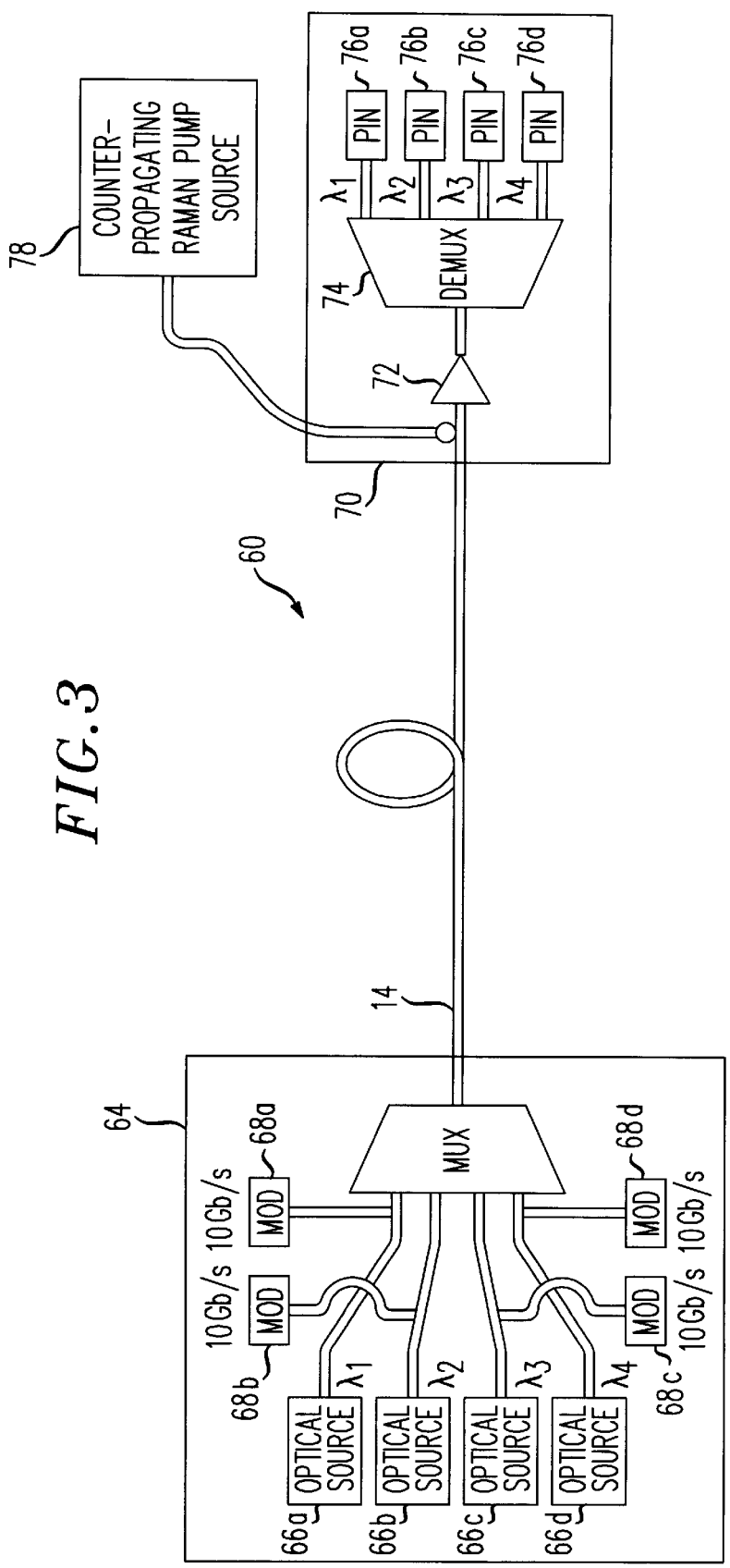
FIG. 3 is a schematic view depicting multiple channel transmission, over the single mode fiber communication link of FIG. 1, via the addition of n-1 optical sources, wavelength division multiplexing, and the introduction of Raman amplification at the terminal end, in accordance with an alternate embodiment of the upgrade technique of the present invention, to thereby obtain an n-fold increase in the transmission capacity over the system of FIG. 1.

In FIG. 3, there is shown an alternate arrangement for upgrading the existing communication system of FIG. 1 utilizing Raman amplification in accordance with the present invention. In this case, wavelength division multiplexing of the output of multiple optical sources is employed to achieve multiple channel transmission over the existing optical fiber links, as link 14 of the original arrangement of FIG. 1.

In the upgraded communication system 60 depicted in FIG. 3, the transmitter 64 has been modified to launch multiple wavelength channels into fiber link 14. For the illustrative four channel arrangement of FIG. 3, transmitter 64 is configured with four optical sources, generally indicated at 66a, 66b, 66c, and 66d, which may be, for example, distributed feedback diode pumped lasers. Each optical source is operable to output a respective optical signal, the output signals being collectively centered about a communication wavelength such as 1550 nm. In a presently preferred embodiment, the output signal of each of the optical sources has a wavelength between from 1525 to 1585 nm, with an especially preferred wavelength range being between from 1540 to 1565 nm.

By way of specific example, the four channels—indicated generally at $\lambda_1$, $\lambda_2$, $\lambda_3$, and $\lambda_4$, respectively, may correspond to wavelengths of 1552.6 nm, 1555.3 nm, 1557.0 nm, and 1558.5 nm.

With continued reference to FIG. 3, it will be seen that upgraded communication system 60 further includes a plurality of modulators, indicated generally at 68a, 68b, 68c, and 68d, respectively, for modulating a corresponding one of the aforementioned channels with data. The modulated channels are then wavelength division multiplexed and launched onto existing fiber link 14. At the terminal end of fiber link 14, the receiver 70 is essentially conventional in construction and is configured with a pre-amplifier 72, a wavelength router 74 and a plurality of photodetectors indicated generally at 76a, 76b, 76c, and 76d, respectively. In accordance with the upgrade technique of the present invention, however, a Raman gain source 78 is also provided at the terminal end of existing link 14.

Essentially, the wavelength of pump source 78 is selected in accordance with the specific characteristics and operating requirements of a given installation. For example, if additional wavelengths are added that are falling on the edge of the $Er^{3+}$ amplifier gain curve, the Raman gain could be tailored to extend the gain bandwidth of the composite $Er^{3+}$/Raman gain. In the illustrated embodiment, in which all of the wavelength channels are in the wavelength range between 1550 nm and 1560 nm, a pump source wavelength of 1453 nm was employed since it provides maximum gain over that range. In that regard, it should be noted that the Raman gain employed in accordance with the present invention is not the primary means of amplification and is not intended to replace the existing optical amplifiers and repeaters that may be employed in the existing link. In accordance with the present invention, the existing architecture of the link is unaltered.

Figure 4:
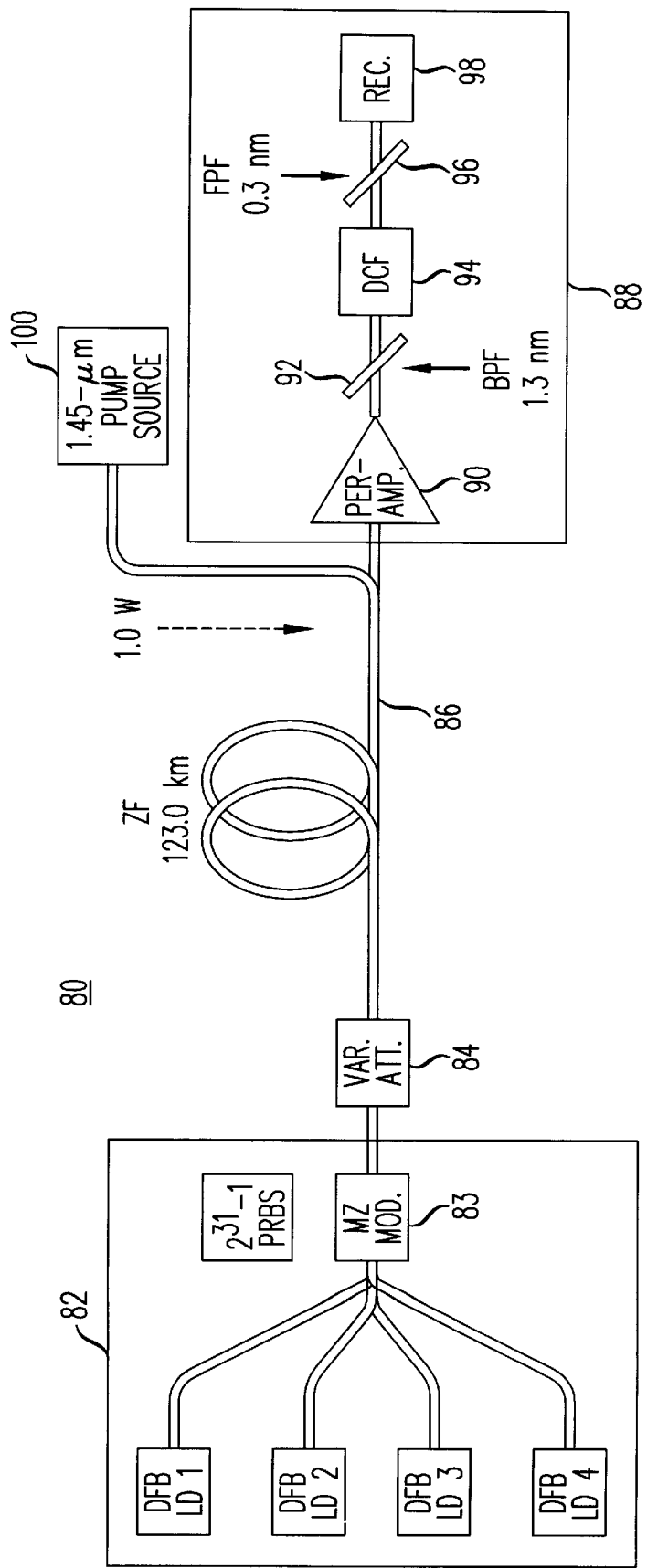
FIG. 4 is a schematic view of an experimental system configured to investigate the performance of a communication system upgraded in accordance with the teachings of the present invention.

FIG. 4 depicts an experimental apparatus 80 employed to investigate the performance of a communication system upgraded to achieve multiple channel transmission in accordance with the teachings of the present invention. As seen in FIG. 4, the experimental apparatus 80 includes a transmitter 82 having a plurality of diode pumped laser optical sources indicated generally at LD1, LD2, LD3, and LD4, respectively. The wavelengths of the four optical sources were 1552.6 nm, 1555.3 nm, 1557.0 nm, and 1558.5 nm, respectively. For investigation of single channel transmission, only one of the four optical sources—LD2 operating at 1555.3 nm, was operated. The output of the optical sources was combined in a fiber directional coupler (not shown). Transmitter 82 further includes a Mach-Zehnder modulator 83 which encodes a $2^{31}-1$ pseudorandom bit sequence onto one (or four) of the four carrier wavelengths, respectively, at a data rate of 10 Gb/s.

A section of existing fiber was modeled by a variable attenuator 84 and a 123 km section of low-loss silica core fiber 86. The fiber has an average loss of 0.173 dB/km, dispersion of 19.7 ps/nm/km, and an effective mode field diameter of ~80 $\mu m^2$. The receiver 88 comprises an optical pre-amplifier 90, a 1.3 nm interference (band pass) filter 92, a dispersion compensating fiber (DCF) module 94, a 0.3 nm tracking Fabry-Perot filter 96, and a photodetector (PIN) 98.

The optical pre-amplifier exhibits an unsaturated gain and noise figure of 41.5 dB and 3.7 dB, respectively. The DCF module consists of one span of DCF with a total dispersion of 2320 ps/nm followed by an Erbium-doped fiber amplifier to offset the loss.

Finally, the investigative apparatus of FIG. 4 includes a 1.0 W Raman laser pump source 100 with a center wavelength of 1453 nm. During operation of the investigative apparatus 80, relatively low optical powers were launched into the fiber-span to obtain a measurement of the effects of Raman gain without the influence of other fiber non-linearities such as self-phase modulation, cross-phase modulation, and four wave mixing, which are often present in long-span repeaterless transmission systems. Self-phase modulation combined with chromatic dispersion, for example, often results in an improvement of the receiver sensitivity that depends on the launched power per channel.

Figure 5:
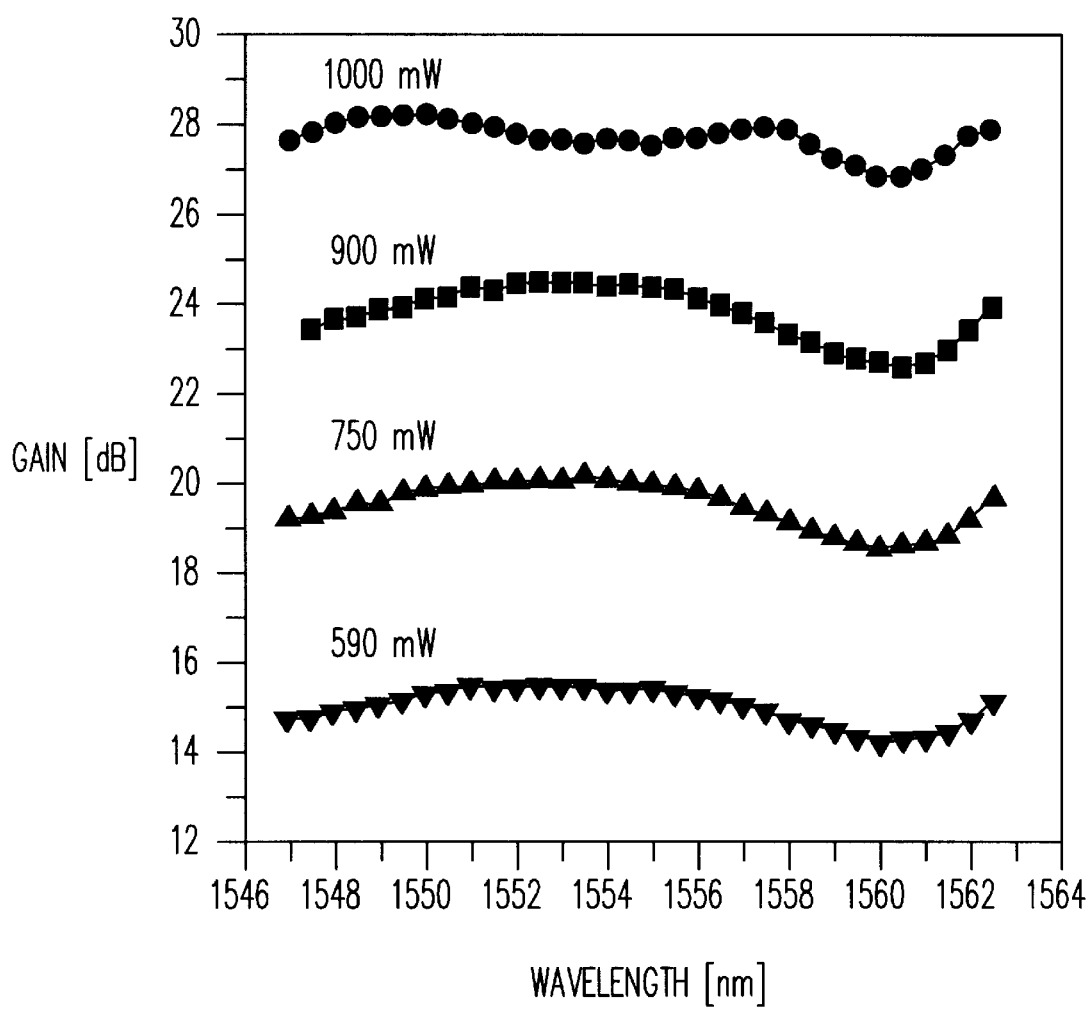
FIG. 5 is a graphical plot depicting measured Raman gain, in the silica-core fiber link employed in the experimental system of FIG. 3, obtained by diode pumped sources of different powers.

With reference now to FIG. 5, there is shown the measured Raman gain spectra for pump powers of 590 mW, 750 mW, 900 mW, and 1000 mW. An input power corresponding to an output power of −32.5 dB in the absence of Raman gain was used for the measurements. At the highest pump power of 1000 mW, the peak gain is 28.1 dB. The peak to peak variation over the measured wavelength range from 1547.0 nm to 1562.5 nm is 1.3 dB. A pump wavelength of 1453 nm was chosen as it provides maximum gain in the wavelength range between 1550 nm and 1560 nm. As expected, the logarithm of the gain (i.e., the gain in dBs) is proportional to the pump power.

The Raman efficiency coefficient is defined as $C_R = g_R/(bA_{eff})$, where $g_R$ is the Raman gain coefficient, $A_{eff}$ is the effective cross-section area, and b accounts for the degree of polarization (linear polarized: b=1; unpolarized: b=2). The Raman efficiency coefficient $C_R$ is estimated to be $3.3 \times 10^{-4}$ m$^{-1}$ W$^{-1}$. Other types of fibers, such as dispersion shifter fiber typically have Raman coefficients which are two to three times higher. Consequently, such fibers would require less pump power to achieve the same gain.

Figure 6:
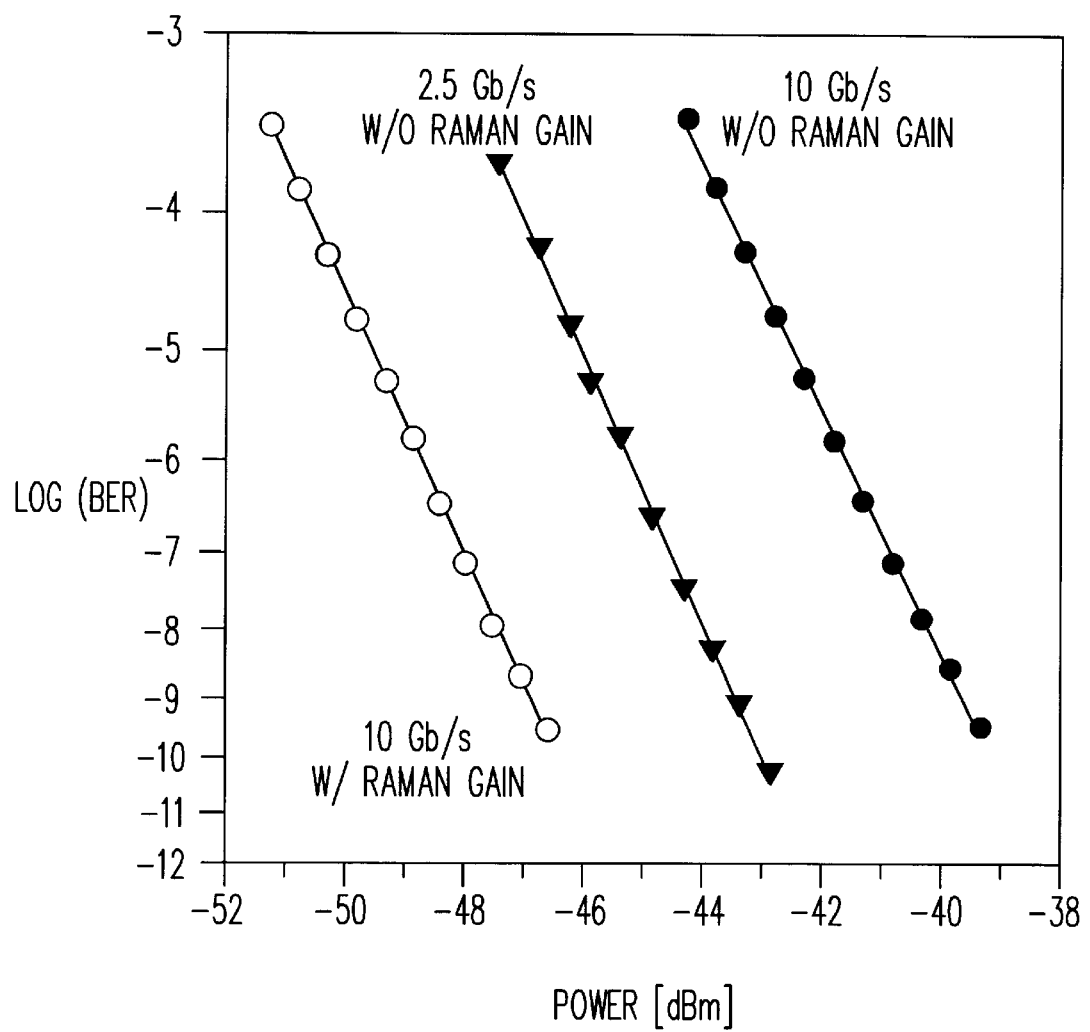
FIG. 6 is a graphical plot showing measured single channel bit error rate (BER) performance of the experimental system of FIG. 3, with and without Raman gain.

Single channel sensitivity measurements at 10 Gb/s results in the bit error rate performance depicted in FIG. 6. The measured bit error rate is plotted against the received power at the receiver in the absence of Raman gain. The sensitivity for an error-rate of $10^{-9}$ is −37.7 dBm without Raman gain. With Raman from a pump power of 1000 mW, the effective sensitivity is measured to be −45.1 dBm—corresponding to an increase in power budget of 7.4 dB.

Figure 7:
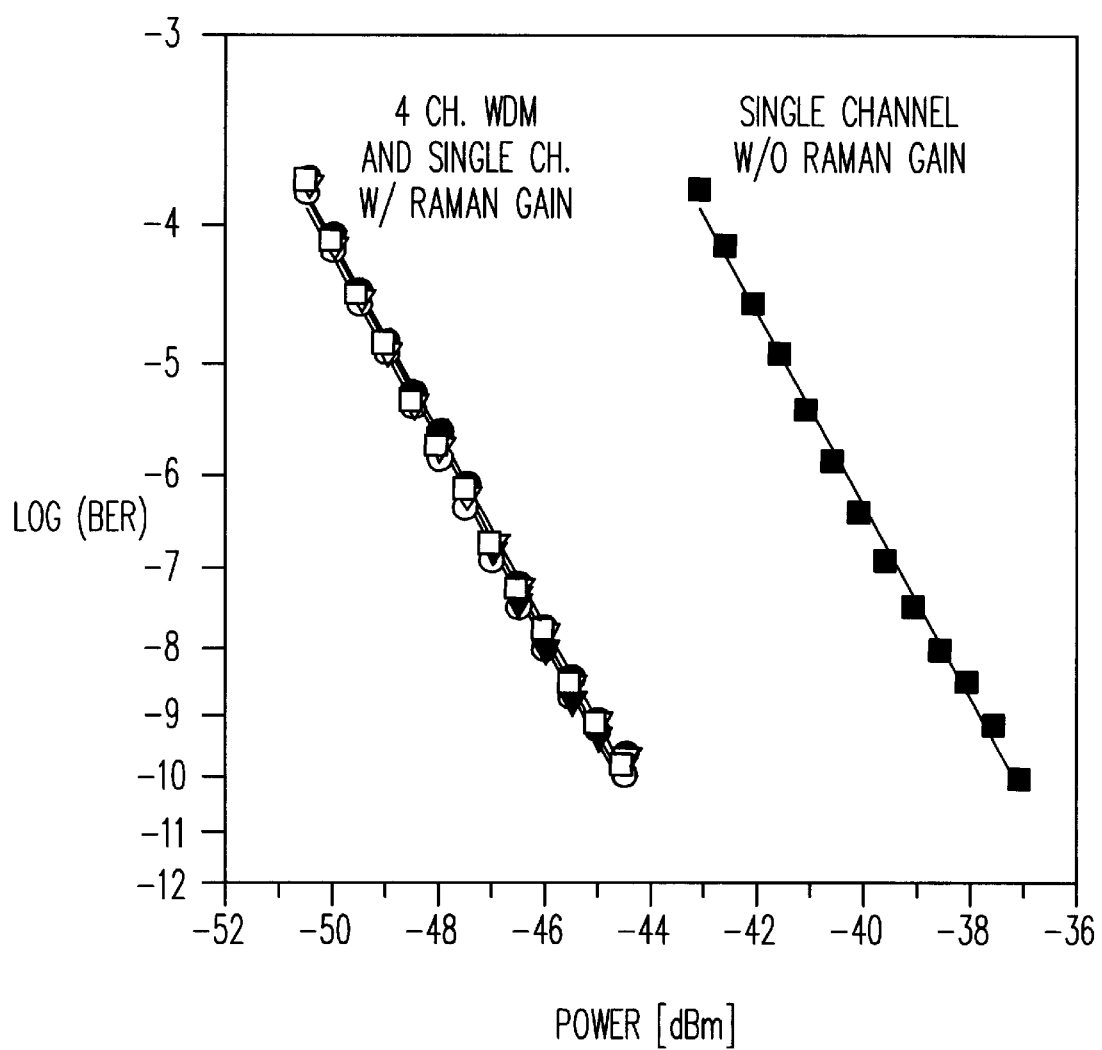
FIG. 7 is a graphical plot comparing measured bit error rate (BER) in the experimental system of FIG. 3 for four WDM channels employing Raman gain in accordance with the present invention with that of a single channel without Raman gain.

Assuming a constant total launch power, the investigative results support the applicants' conclusions herein that an increase in power budget may be utilized to add more channels of the same bit rate. FIG. 7 shows the measured bit-error rates for four channels of 10 Gb/s each with Raman gain from 1000 mW of pump power. For comparison, the single channel-result without Raman gain is included in the graphical representation of FIG. 7. The measured sensitivities for error rates of $10^{-9}$ of channels 1, 2, 3, and 4 are −45.1 dBm, −45.2 dBm, −45.2 dBm, and −45.1 dBm, respectively. The spread of 0.1 dB is within the measurement uncertainty. Consequently, the bit error rate performance of the system is not degraded when it is upgraded from one channel to four channels using Raman gain in accordance with the present invention. Wavelengths and sensitivities are summarized in Table 1.

TABLE 1

Measured wavelength and corresponding receiver sensitivity

| Channel | Raman gain | Wavelength | Sensitivity |
|---------|------------|------------|-------------|
| 1 | Yes | 1552.6 nm | −45.1 dBm |
| 2 | Yes | 1555.3 nm | −45.2 dBm |

TABLE 1-continued

Measured wavelength and corresponding receiver sensitivity

| Channel | Raman gain | Wavelength | Sensitivity |
|---------|------------|------------|-------------|
| 3 | Yes | 1557.0 nm | −45.2 dBm |
| 4 | Yes | 1558.5 nm | −45.1 dBm |
| Single | Yes | 1555.3 nm | −45.1 dBm |
| Single | No | 1555.3 nm | −37.7 dBm |

What is claimed is:

1. A method of operating an existing optical communication system, in which a single optical fiber provides a link between a first node and a second node, to provide increased information carrying capacity, the system having an initial maximum power budget, the first node having a signal transmitter operable at an associated wavelength, and the second node having a receiver, wherein data is transmitted from the first node to the second node at a first data transmission rate, the method comprising the steps of:

providing at the second node, an optical pump source operable at a wavelength selected to provide, by counter-propagation, Raman gain to a signal output by the signal transmitter to thereby obtain an amplified signal, an increased effective receiver sensitivity, and increased maximum power budget; and;

modulating the optical signal output by the signal transmitter with data to provide data transmission at a second rate higher than said first data transmission rate and incompatible with said initial maximum power budget but compatible with said increased maximum power budget.

2. The method as defined in claim 1, further including a step of:

providing a signal transmitter operable at said second data transmission rate, whereby Raman gain provides sufficient additional system margin to enable said second data transmission rate.

3. The method as defined in claim 1, further including a step of:

providing, at said first node, a plurality of signal transmitters each operable to output a corresponding optical signal having a corresponding wavelength; and wavelength division multiplexing the optical signals output by said signal transmitters to thereby obtain said second data transmission rate, whereby Raman gain provides sufficient additional system margin to enable said second data transmission rate.

4. The method as defined in claim 3, wherein said optical pump source is operable to provide Raman gain for at least some of said plurality of signal transmitters.

5. The method as defined in claim 4, wherein the output of each of said plurality of signal transmitters has a wavelength between from 1525 to 1585 nm.

6. The method as defined in claim 5, wherein the output of each of said plurality of signal transmitters has a wavelength between from 1540 to 1565 nm.

7. The method as defined in claim 3, wherein the output of at least one of said plurality of signal transmitters has a wavelength between from 1525 to 1585 nm.

8. The method as defined in claim 7, wherein the output of at least one of said plurality of signal transmitters has a wavelength between from 1270 to 1350 nm.

9. The method as defined in claim 8, wherein the output of at least one of said plurality of signal transmitters has a wavelength between from 1290 to 1330 nm.

10. The method as defined in claim 7, wherein the output of one of said plurality of signal transmitters has a wavelength between from 1620 to 1660 nm, whereby an OTDR signal may be amplified to obtain improved system monitoring capabilities.

11. The method as defined in claim 1, wherein said link includes at least one erbium doped fiber amplifier (EDFA) and has an associated gain bandwidth, and wherein said method future includes a step of:

providing an optical pump source having an output wavelength such that Raman gain provided by the optical pump source, in combination with gain provided by said at least one EDFA, provides at least one of an extended and flattened link gain bandwidth.

12. The method as defined in claim 11, wherein said optical pump source as an output wavelength of between from 1420 to 1490 nm.

13. The method as defined in claim 12, wherein said optical pump source has an output wavelength of 1470 nm.

14. A method of upgrading an existing optical communication system, in which a single optical fiber provides a link between a first node and a second node, to provide increased information carrying capacity, the system having an initial maximum power budget, the first node having a signal transmitter operable at an associated wavelength, and the second node having a receiver, wherein data is transmitted from the first node to the second node at a first data transmission rate, the method comprising the steps of:

providing at the first node, a plurality of signal transmitters each operable to output a corresponding optical signal having a corresponding wavelength; and providing at the second node, at least one optical pump source operable at a wavelength selected to provide, by counter-propagation, Raman gain to a signal output by the signal transmitter to thereby obtain an amplified signal, an increased effective receiver sensitivity, and increased maximum power budget;

whereby the optical signals output by said signal transmitters may be wavelength division multiplexed and modulated to provide data transmission at a second rate higher than said first data transmission rate and incompatible with said initial maximum power budget but compatible with said increased maximum power budget.

15. The method as defined in claim 14, wherein the output of each of said plurality of signal transmitters has a wavelength between from 1525 to 1585 nm.

16. The method as defined in claim 15, wherein the output of each of said plurality of signal transmitters has a wavelength between from 1540 to 1565 nm.

17. The method as defined in claim 14, wherein the output of at least one of said plurality of signal transmitters has a wavelength between from 1525 to 1585 nm.

18. The method as defined in claim 17, wherein the output of at least one of said plurality of signal transmitters has a wavelength between from 1270 to 1350 nm.

19. The method as defined in claim 18, wherein the output of at least one of said plurality of signal transmitters has a wavelength between from 1290 to 1330 nm.

20. The method as defined in claim 18, wherein the output of one of said plurality of signal transmitters has a wavelength between from 1620 to 1660 nm, whereby an OTDR signal may be amplified to obtain improved system monitoring capabilities.

21. The method as defined in claim 14, wherein said link includes at least one erbium doped fiber amplifier (EDFA) and has an associated gain bandwidth, and wherein said method future includes a step of:

providing an optical pump source having an output wavelength such that Raman gain provided by the optical pump source, in combination with gain provided by said at least one EDFA, provides at least one of an extended and flattened link gain bandwidth.

22. The method as defined in claim 21, wherein said optical pump source has an output wavelength of between from 1420 to 1490 nm.

23. The method as defined in claim 22, wherein said optical pump source has an output wavelength of 1470 nm.

* * * * *